(12) United States Patent
Zhang et al.

(10) Patent No.: US 7,995,730 B1
(45) Date of Patent: Aug. 9, 2011

(54) METHOD AND SYSTEM FOR MASQUERADING THE IDENTITY OF A COMMUNICATION DEVICE RETURNING A MISSED CALL

(75) Inventors: Baoquan Zhang, Overland Park, KS (US); Von McConnell, Leawood, KS (US); Farni Weaver, Spring Hill, KS (US); Arun Santharam, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 1314 days.

(21) Appl. No.: 11/588,703

(22) Filed: Oct. 27, 2006

(51) Int. Cl.
 *H04M 3/42* (2006.01)
 *H04M 1/57* (2006.01)
 *H04M 15/06* (2006.01)

(52) U.S. Cl. ......... 379/201.11; 379/142.09; 379/207.15; 455/415

(58) Field of Classification Search ............ 379/142.01, 379/142.09, 201.01, 201.11, 207.15; 455/415
See application file for complete search history.

(56) References Cited

U.S. PATENT DOCUMENTS

| | | | |
|---|---|---|---|
| 5,283,824 A * | 2/1994 | Shaw ................. | 379/142.09 |
| 5,497,414 A | 3/1996 | Bartholomew | |
| 5,590,184 A * | 12/1996 | London ............... | 379/142.09 |
| 6,311,057 B1 | 10/2001 | Barvesten | |
| 6,343,120 B1 * | 1/2002 | Rhodes ............... | 379/142.01 |
| 6,571,094 B1 | 5/2003 | Begeja et al. | |
| 7,602,901 B1 * | 10/2009 | Kates et al. ......... | 379/373.01 |
| 2003/0195010 A1 | 10/2003 | Pattabiraman et al. | |
| 2004/0190703 A1 | 9/2004 | Trandal et al. | |
| 2004/0235520 A1 | 11/2004 | Cadiz et al. | |
| 2005/0047561 A1 | 3/2005 | Seiferth | |
| 2005/0277406 A1 | 12/2005 | Diroo et al. | |
| 2005/0277408 A1 | 12/2005 | Stuckman et al. | |
| 2006/0067498 A1 | 3/2006 | Plas et al. | |
| 2007/0263819 A1 * | 11/2007 | Finkelman et al. ...... | 379/201.11 |

* cited by examiner

*Primary Examiner* — Harry S Hong

(57) ABSTRACT

A method and apparatus for masquerading the identity of a first communication device returning a missed call placed by a second communication device to a third communication device. The first communication device receives a missed call notification indicating the second communication device placed a first call to the third communication device. Thereafter, the first communication device initiates a second call to the second communication device and directs a network to deliver to the second communication device caller identification information that indicates the second call originates from the third communication device. Moreover, the first communication device may include a missed call log that includes missed call notifications for missed calls placed directly to the first communication device as well as missed call notifications for missed calls originally placed to another communication device. The first communication device can present to a user missed call notifications stored in the missed call log.

23 Claims, 6 Drawing Sheets

METHOD AND SYSTEM FOR MASQUERADING THE IDENTITY OF A COMMUNICATION DEVICE RETURNING A MISSED CALL

FIELD OF INVENTION

The present invention relates to network communications, and more particularly to masquerading the identity of a communication device returning a missed call.

DESCRIPTION OF RELATED ART

Communication devices allow users to place outgoing calls and to receive incoming calls. A call that is not answered is a missed call. Missed calls may occur for any of a variety of reasons. For instance, a call to a user's communication device may be missed if the user's device is not powered on when the call is placed to the user's device, if the user is not near the user's device when the call is received at the user's device, or if the user chooses to not answer the call. Other examples of why a call may be missed are also possible.

Quite often, a user of a communication device may desire to return a missed call. In certain situations, missed call information may be provided to a communication device that missed a call so as to allow a user of the communication device to return the missed call. One current approach for providing missed call information to a communication device consists of a missed call server providing the missed call information to the communication device. The missed call server may provide the missed call information in response to the communication device requesting the missed call information. The missed call information of this approach comprises caller information and call information. The call information is determined by the server and comprises call date, call time, call priority, call message and like information associated with the missed call. In accordance with this approach, the communication device can use at least a portion of the retrieved missed call information to initiate a return call.

Further, some currently available communication systems allow a caller to place a call to a called communication device (e.g., a private branch exchange (PBX) phone at a user's place of employment), and if a user of the called communication device misses the call, the communication systems may automatically route the call to a substitute communication device (e.g., the user's cellular phone). The call routed to the substitute communication device may be answered, or the call routed to the substitute communication device may be missed.

The user may use the substitute communication device to return a call missed by both the called communication device and the substitute communication device. However, under some circumstances, the user may choose to not return the missed call from the substitute communication device if caller identification information indicating the substitute communication device is returning the missed call would be sent to the caller who placed the missed call. For instance, the user may make such a choice when the user is at a location (e.g., a beach) remote from the user's place of employment (e.g., a factory) at a time when the user is supposed to be at the user's place of employment. In light of the currently available communication systems, an improvement is desired.

SUMMARY

The present invention provides a method and system for masquerading the identity of a communication device returning a missed call. Masquerading the identity of the communication device permits a user to provide a called party of a returned missed call with caller identification (ID) information of another communication device rather than caller ID information of the communication device that is actually returning the missed call.

In one respect, an exemplary embodiment of the present invention may take the form of a method. The method may involve a first communication device receiving a missed call notification that indicates a first call was placed by a second communication device to a third communication device. After receiving the missed call notification, the first communication device may initiate a second call to the second communication device and direct a network to deliver to the second communication device caller ID information that indicates the second call originates from the third communication device.

In another respect, an exemplary embodiment of the present invention may take the form of a first communication device that includes: (i) a communication interface for communicating with a network, (ii) a processor connected to the communication interface, and (iii) data storage connected to the processor. The processor may receive from the communication interface via the network a missed call notification that indicates a first call was placed by a second communication device to a third communication device. The data storage may contain program instructions executable by the processor so as to cause the processor to initiate a second call to the second communication device and to direct the network to deliver to the second communication device caller ID information that indicates the second call originates from the third communication device.

In yet another respect, an exemplary embodiment of the present invention make take the form of a method that is carried out by a server within a system comprising the server, a first communication device, a second communication device, and a third communication device, wherein the first communication device receives a missed call notification indicating a first call was placed by the second communication device to the third communication device. This method may involve: (i) receiving from the first communication device a first call origination request to (a) initiate a second call to the second communication device, and (b) deliver to the second communication device caller ID information indicating the second call originates from the third communication device, and (ii) in response to receiving the first call origination request, sending to the second communication device a second call origination request and the caller ID information indicating the second call originates from the third communication device.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Overview

The present invention is directed to a method and system for masquerading an identity of a communication device returning a missed call. As used herein, the term 'the first communication device' will refer to a device which receives a missed call notification indicating a first call was placed by a second communication device to a third communication device, the term 'the second communication device' will refer to a device which placed the missed call, and the term 'the third communication device' will refer to a device originally called by the second communication device.

2. Exemplary Architecture

Figure 1:
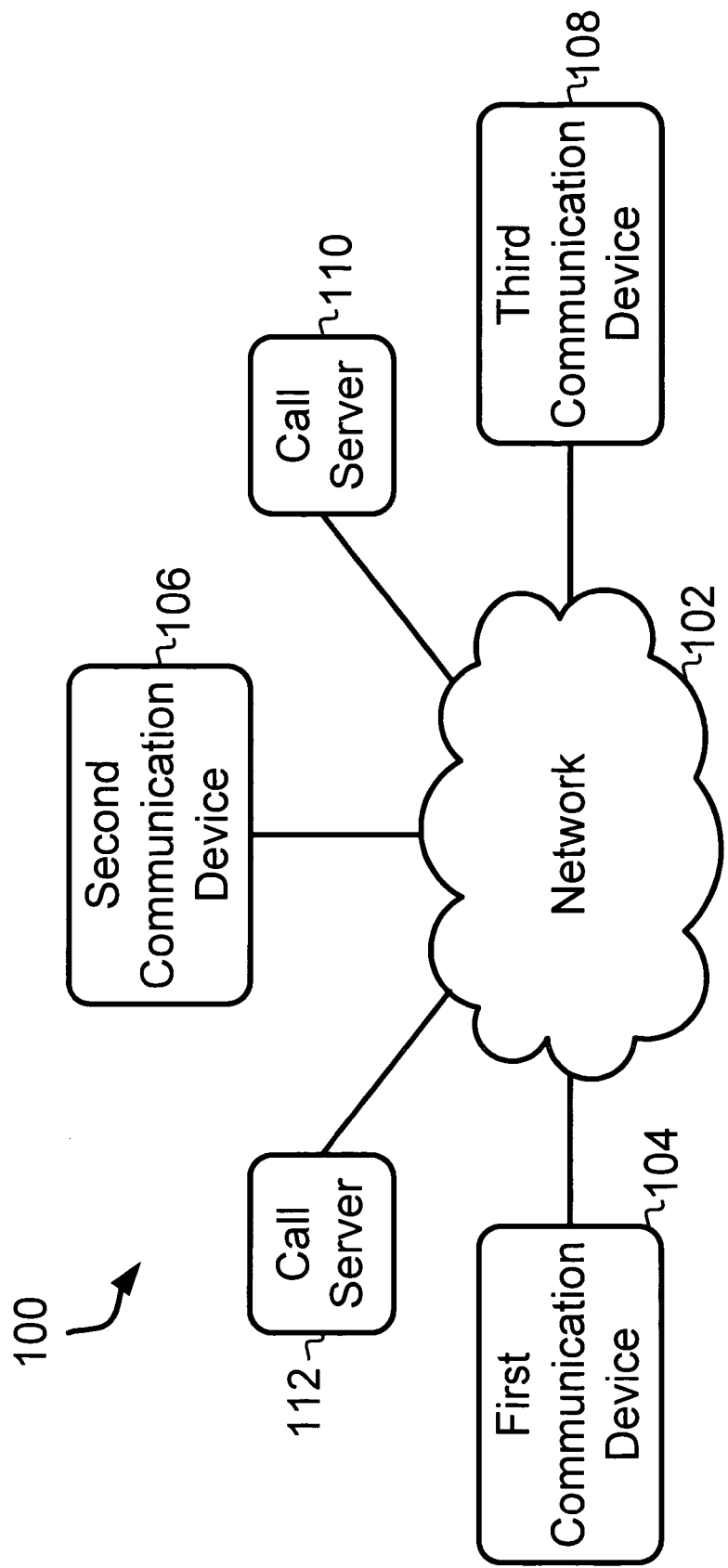
FIG. 1 is a simplified block diagram of a network arrangement in which an exemplary embodiment of the invention can be implemented.

FIG. 1 is a block diagram of a network arrangement 100 arranged to carry out the present invention. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Many of the elements described herein are functional entities that may be implemented as discrete or distributed components or in conjunction with other components, in any suitable combination and location, and as any suitable combination of hardware, firmware, and/or software. Furthermore, identical reference numerals are used herein to denote elements which are identical to similarly numbered elements so as to avoid repeating an explanation of the elements.

The network arrangement 100 may include a network 102, a first communication device 104, a second communication device 106, a third communication device 108, a first call server 110, and a second call server 112. Each of the communication devices 104-108 and the call servers 110-112 may be an entity within the network 102. The network arrangement 100 may vary in other ways from the arrangement shown.

The network 102 may include one or more networks. For example, the network 102 may include one or more wireline networks including at least one electrical or optical conductor. Alternatively, or in combination, the network 102 may include one or more wireless networks including at least one air interface. In addition to the communication devices 104-108 and the call servers 110-112, the network 102 may include one or more additional network entities that interface to the network wirelessly or via a wired conductor. The one or more additional network entities may include a server, a client, a router, a switch, a gateway, a data storage device, or any other type of network entity that interfaces to the network 102.

The communication devices 104-108 may all be the same type of device or may differ in form from each other. Each of the communication devices 104-108 may be a wireless communication device that interfaces to a wireless network and/or a wireline communication device that interfaces to a wireline network. A wireline communication device may be a session initiation protocol (SIP) phone, a private branch exchange (PBX) phone, a plain old telephone system (POTS) phone connected to a public switched telephone network (PSTN), or any other type of wireline communication device. A wireless communication device may be a cellular phone, a laptop computer having a wireless local area network (LAN) interface, or any other type of wireless communication device. Additional communication devices other than communication devices 104-108 may also interface to the network 102.

For purposes of this description, a first telephone number '(219) 555-1111' and/or a first Uniform Resource Indicator (URI) '2195551111@network.com' is assumed to be associated with the first communication device 104, a second telephone number '(219) 555-2222' and/or a second URI '2195552222@network.com' is assumed to be associated with the second communication device 106, and a third telephone number '(219) 555-3333' and/or a third URI '2195553333' is assumed to be associated with the third communication device 108.

In accordance with the present invention, the first communication device 104 can receive a missed call notification indicating a first call was placed by the second communication device 106 to the third communication device 108. After receiving the missed call notification, the first communication device 104 can initiate a second call to the second communication device 106 and direct the network 102 to deliver to the second communication device 106 caller ID information that indicates the second call originates from the third communication device 108. In this way, the first communication device 104 can return a missed call and masquerade the identity of the first communication device 104 from the second communication device 106 to which the return missed call is placed.

Figure 2:
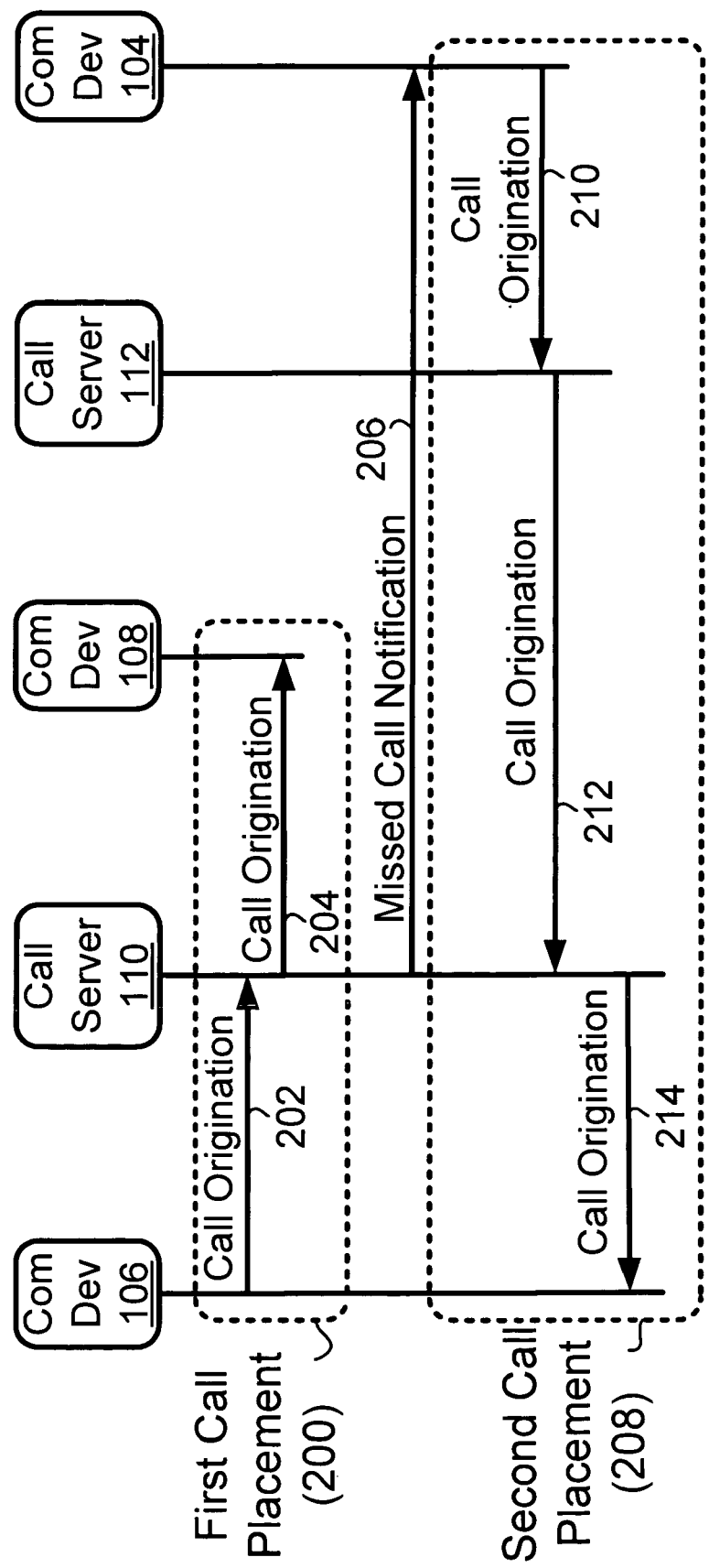
FIG. 2 is a message flow diagram depicting communications in accordance with an exemplary embodiment.

FIG. 2 is a message flow diagram depicting a flow of messages for carrying out an exemplary embodiment of the present invention. As shown in FIG. 2, placement of a first call 200 from the second communication device 106 to the third communication device 108 may include transmission of a call origination message 202 from the second communication device 106 to the call server 110 and then transmission of a call origination message 204 from the call server 110 to the third communication device 108.

Other messages may also be communicated between the second communication device 106 and the call server 110, between the call server 110 and the third communication device 108, and/or between the second communication device 106 and the third communication device 108, so as to initiate the first call 200. These other messages are not shown for clarity of describing the invention.

The call origination messages 202-204 may be arranged according to any of a variety of message protocols. For example, one or more of the call origination messages 202-204 may be arranged as a SIP INVITE message indicating the telephone number associated with the third communication device 108 (i.e., the called number) as a URI such as '2195553333@network.com' and the telephone number associated with the second communication device 106 (i.e., the caller's number) as a URI such as '2195552222@network.com.' In accordance with this example, the call server 110 may be a SIP server and the second communication device 106 may be a SIP phone.

As another example, the call origination message 202 may comprise dual tone multiple frequency (DTMF) signaling indicating a dialed number (e.g., (219) 555-3333), and the call origination message 204 may comprise an Integrated Service digital network User Part (ISUP) initial address message (IAM) indicating the called number (e.g., (219) 555-3333) and the caller's number (e.g., (219) 555-2222). In accordance with this example, a switch located between the call server 110 and the third communication device 108 may convert the IAM to a ring signal such that the call origination message 204 received at the third communication device 108 is the ring signal. In accordance with this example, the call server 110 may be a switching transfer point (STP) within the PSTN or a service switching point (SSP) within the PSTN. Other examples of the call origination messages 202-204 are also possible.

The first call 200 placed from the second communication device 106 to the third communication device 108 may be missed. The first call 200 may be missed for any of a variety of reasons such as that the first call is not answered at the third communication device 108, that the call server 110 ends the first call, or that the first communication device 106 ends the first call. Other reasons why the first call 200 is missed are also possible.

The call server 110 may determine that the first call 200 is missed. The call server 110 may use various methods to determine that the first call 200 is missed. For instance, the call server 110 may receive from the third communication device 108 a message (e.g., a SIP CANCEL message) indicating that the first call 200 (or set up of the first call 200) should be canceled. As another example, the call server 110 may determine that the first call 200 was missed by (i) determining that the third communication device 108 did not answer the first call 200 within a given period of time, and (ii) responsively executing program instructions to end the first call 200 (or set up of the first call 200). Other examples of a method the call server 110 may use to determine the first call 200 was missed are also possible.

After the call server 110 determines that the first call 200 was missed, the call server 110 may determine that a missed call notification 206 should be sent to the first communication device 104. The call server 110 may use various methods to make this latter determination. For example, the call server 110 may access a profile that indicates when the third communication device 108 misses a call, a missed call notification should be sent to the first communication device 104. The profile may be associated with the third communication device 108 and may be stored in a computer readable data storage medium accessible by the call server 110. As another example, the call server 110 may receive from the third communication device 108 a request to send the missed call notification 206 to the first communication device 104. Other exemplary methods the call server 110 may use to determine that the missed call notification 206 should be sent to the first communication device 104 are also possible.

Transmission of the missed call notification 206 may take place using any of a variety of methods. For example, transmission of the missed call notification 206 may include transmission of a message such as a SIP message, a Short Message System (SMS) message, a Multimedia Message Service (MMS) message, an e-mail message, or a PBX missed call message. Each of these messages or another type of missed call notification message may describe the first call by describing a caller's name, a caller's number, a date and time of the first call 200, and any other data that may describe the first call 200.

As another example, transmission of the missed call notification may include transmitting a caller ID message during a missed call notification call initiated by the call server 110 to the first communication device 104. In an exemplary embodiment in which the first communication device 104 is a POTS phone, the caller ID message may be sent after a first ring burst is sent to the first communication device 104 during setup of the missed call notification call. The missed call notification call may be torn down after the caller ID message is sent to the communication device 104. The caller ID message may be displayed on the POTS phone and/or on a caller ID device connected to the POTS phone.

Table 1 depicts data that may be sent in an exemplary caller ID message during a missed call notification call. The caller ID message may include an information code (e.g., 05h) that indicates the caller ID message pertains to a missed call. The directory number data may indicate the missed call was placed by the second communication device 106 (e.g., telephone number (219) 555-2222) to the third communication device 108 (e.g., telephone number (219) 555-3333). The caller ID message may include data indicating a date and time the missed call was placed as well as checksum data for confirming the caller ID message is not corrupt. Other examples of a caller ID message and other types of data that may be included in the caller ID message are also possible.

TABLE 1

Missed Call Notification - Caller ID message

| Missed Call Notification Data | Data Description |
|---|---|
| 05h | Missed Call Notification delivery information code |
| 1Ch | 28 decimal; Number of data words (date, time, and directory number words) |
| 31, 32 | 12; December (month) |
| 31, 35 | 15; 15$^{th}$ day (day of month) |
| 31, 36 | 16; 16$^{th}$ hour (4:00 PM) |
| 34, 33 | 43; 43 minutes (i.e., 4:43 PM) |
| 32, 31, 39, 35, 35, 35, 32, 32, 32, 32 | (219) 555-2222; calling party's directory number |
| 32, 31, 39, 35, 35, 35, 33, 33, 33, 33 | (219) 555-3333; called party's directory number |
| xxh | Checksum word |

As shown in FIG. 2, placement of a second call 208 from the first communication device 104 to the second communication device 106 may include: (i) transmission of a call origination message 210 from the first communication device 104 to the call server 112, (ii) transmission of a call origination message 212 from the call server 112 to the call server 110, and (iii) transmission of a call origination message 214 from the call server 112 to the third communication device 108. The second call 208 may be a return call (i.e., a call placed in response to the first call 200).

One or more of the call origination messages 210-214 may direct the network 102 to deliver to the second communication device 106 caller ID information that indicates the second call 208 originates from the third communication device 108. Directing the network 102 to deliver the caller ID information may include the directing one or more network entities to deliver the caller ID information to the second communication device 106.

The call origination messages 210-214 may be arranged according to any of a variety of message protocols. For example, one or more of the call origination messages 210-214 may be arranged as a SIP INVITE message that directs the network 102 to deliver to the second communication device 106 caller ID information indicating the second call 208 originates from the third communication device 108. In accordance with this example, one or more of the call servers 110-112 may be a SIP server, and the SIP INVITE message(s) may include the caller ID information in the form of a URI (e.g., '2195553333@network.com') to identify that the second call 208 originates from the third communication device 108.

As another example, the call origination message 210 may comprise DTMF signaling directing the network 102 to deliver caller ID information to the second communication device 106 indicating the second call 208 originates from the third communication device 108. By way of example, the DTMF signaling may include signaling representing the characters: '2195552222*932195553333.' In accordance with this example, the first ten characters (i.e., '2195552222') may indicate the phone number of the second communication device 106 (i.e., the called device of the second call 208), the next three characters (i.e., '*93') may indicate a feature code directing the network 102 to deliver the caller ID information indicating the second call 208 originates from the third communication device 108, and the last ten characters (i.e., '2195553333') may indicate the phone number of the third communication device 108.

The call server 112 may convert DTMF signaling of the call origination message 210 into an ISUP IAM message, a SIP INVITE message, or some other message to be sent as the call origination message 212. The call origination messages 212-214 may include data indicating the phone number or URI of the second communication device 106 (i.e., the called device of the second call 208) and a phone number or URI of the third communication device 108 as caller ID information to indicate the second call 208 originates from the third communication device 108. If one of the call origination messages 210-214 is an ISUP IAM message, the ISUP IAM message may trigger the network 102 to produce (i) ring signals, and (ii) a caller ID message indicating the second call 208 originates from the third communication device 108. The network 102 may deliver to the second communication device 106 the caller ID message after delivering a first ring signal and prior to delivering a second ring signal.

Upon receiving the call origination message 214 including the caller ID information indicating the second call 208 originates from the third communication device 108, the second communication device 106 may display the received caller ID information so as to inform a user that the second call 208 originates from the third communication device 108 even though the second call 208 originates from the first communication device 104.

Figure 3:
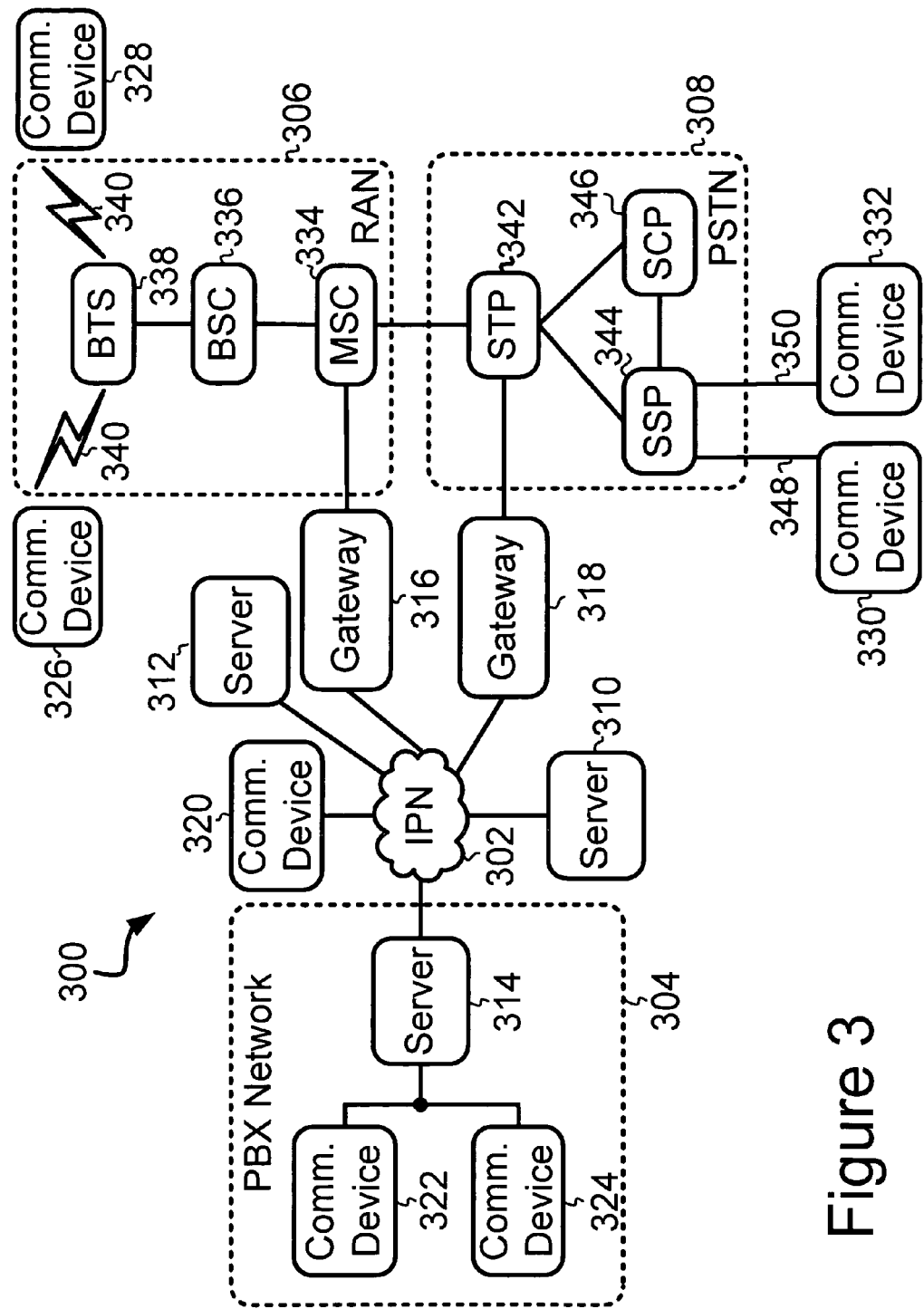
FIG. 3 is another simplified block diagram of a network arrangement in which an exemplary embodiment of the invention can be implemented.

FIG. 3 is a block diagram of another network arrangement 300 in which an exemplary embodiment of the invention can be implemented. The network arrangement 300 includes: (i) an Internet protocol network (IPN) 302 such as an IEEE 802.3 wireline network and/or an IEEE 802.11x wireless network (e.g., x=a, b, g, etc.), (ii) a PBX network 304, (iii) a radio access network (RAN) 306, and (iv) a PSTN 308. The network arrangement 300 also includes servers 310-314, gateways 316-318, and communication devices 320-332. For a given first and second call, any of the communication devices 320-332 may be arranged as one of the communication devices 104-108.

The server 310 may be a call server such as the call server 110 or the call server 112. The server 310 may be a call server acting as a proxy for setting up and tearing down SIP media sessions (e.g., a voice call) between the communication device 320 and another communication device.

The communication device 320 may be any of a variety of communication devices that connect to and/or interface to the IPN 302. For example, the communication device 320 may be a SIP phone connectable to the IPN 302 so as to communicate with the server 310. As another example, the communication device 320 may be an IP server phone that includes a SIP server to set up and tear down media sessions. Other examples of the communication device 320 are also possible.

The server 312 may be a server that facilitates the transmission of text messages such as a Short Message System (SMS) message, a Multimedia Message Service (MMS) message, a SIP for Instant Messaging and Presence Leveraging Extensions (SIMPLE) message, or an e-mail message. The server 312 may facilitate the transmission of other types of text messages as well.

Facilitating the transmission of a text message may include performing such functions as: (i) receiving from the SIP server 310 or from the communication device 320 a request to transmit a text message to a destination (e.g., the communication device 326), and (ii) forwarding to the IPN-RAN gateway 316 for transmission, in turn, to another entity (e.g., the RAN 306) the request to transmit a text message to the destination. The RAN 306 may receive from the text message server 312 the request to transmit a text message and thereafter transmit the text message to the destination. A request to transmit a text message may include a text message (e.g., a missed call notification).

In an alternative embodiment, the server 312 may be a text message server within the PBX network 304, the RAN 306, or the PSTN 308. In yet another alternative embodiment, the PBX network 304, the RAN 306, and/or the PSTN 308 may each include one or more text message servers that facilitate the transmission of text messages.

The PBX network 304 may include the server 314, the communication device 322, and the communication device 324. The PBX network 304 may be an IP PBX network, the server 314 may be a SIP server, and the communication devices 322-324 may be SIP phones. Alternatively, the PBX network 304 may be a legacy PBX network that that connects to the PSTN 308.

The RAN 306 may include a mobile switching center (MSC) 334, a base station controller 336, a base transceiver station (BTS) 338, and an air interface 340 operating between the BTS 338 and one or more wireless communication devices (e.g., the communication devices 326-328). The BTS 338 radiates RF signals away from the BTS 338 to form a cell. The radiated RF signals are arranged according to an air interface protocol, such as a Code Division Multiple Access (CDMA) protocol (e.g., TIA-EIA-95 or CDMA-2000 1xRTT). The BSC 336 is an interface between the BTS 338 and the MSC 334. The BSC 336 may control the BTS 338 and may provide for call handoffs from BTS 338 to another BTS when a wireless communication device moves from one cell to another cell. The MSC 334 may be a switch for setting up and tearing down calls in which the communication devices 326-328 are a calling party or a called party.

The communication devices 326-328 may be any of a variety of wireless communication devices such as a cellular phone or a satellite phone. The communication devices 326-328 may be the same type of wireless communication device or different types of wireless communication devices. For a given first and second call, the communication devices 326-328 may each function as one of the first communication device 104, the second communication device 106, or the third communication device 108.

The RAN 306, and in particular, the MSC 334 may communicate with the IPN-RAN gateway 316 so as to allow communication devices 326-328 to communicate with other communication devices via the IPN 302. The IPN-RAN gateway 316 may convert voice communications from a first format to a second format. For example, the IPN-RAN gateway 316 may convert voice communications in a time division multiplex (TDM) format or a pulse code modulated (PCM) format into voice communications in a real time transport protocol (RTP) format. Similarly, the IPN-RAN gateway 316 may convert RTP voice communications into TDM voice communications or PCM voice communications. As another example, the IPN-RAN gateway 316 may convert control signals from a first format (e.g., SIP signals) into control signals in a second format (e.g., SS7 signals).

The PSTN 308 may include: (i) a switching transfer point (STP) 342, (ii) a service switching point (SSP) 344, (iii) a service control point (SCP) 346, (iv) a local loop telephone line 348 that connects the communication device 330 to the SSP 344, and (v) a local loop telephone line 350 that connects a communication device 332 to the SSP 344. The communication devices 330-332 may be legacy POTS phones that include a caller ID display or that connect to a device having a caller ID display. The PSTN 308 may include other STPs, SSPs, and SCPs, but these other elements are not shown for clarity.

The STP 342 may be a switch that relays control signals (e.g., SS7 signals) between the SSP 344 and the SCP 346 so as to set up and tear down calls in which communication devices 330-332 are a called party or a calling party. The STP 342 may interface to the IPN-PSTN gateway 318 so as to relay control signals to the IPN 302 and/or to receive control signals from the IPN 302. Similarly, the STP 342 may interface to the MSC 334 so as to transmit control signals to the RAN 306 and/or to receive control signals from the RAN 306.

The SSP 344 may be a switch that connects the local loop telephone lines 348-350 to trunk lines for carrying voice communications to and from communication devices 330-332. The SSP 344 may interface to the IPN-PSTN gateway 318 so as to carry voice communications to the IPN 302 and/or to receive voice communications from the IPN 302. Similarly, the SSP 344 may interface to the STP 342 so as to transmit voice communications to the RAN 306 and/or to receive voice communications from the RAN 306.

The SCP 346 may be an entity for controlling service within the PSTN 308. For example, the SCP 346 may receive a feature code dialed by one of the communication devices 330-332, interpret the received feature code, and responsively provide signals to the STP 342 for setting up a call in response to the received feature code. As an example, the feature code may be '*93' which may represent a feature for masquerading the identity of a device returning a missed call. Other examples of feature codes representing a feature for masquerading the identity of a device returning a missed call are also possible.

The PSTN 308 may communicate with the IPN-PSTN gateway 318 so as to allow communication devices 330-332 to communicate with other communication devices via the IPN 302. The IPN-PSTN gateway 318 may convert voice communications from a first format to a second format. For example, the IPN-PSTN gateway 318 may convert voice communications in a TDM format or a PCM format into voice communications in an RTP format. Similarly, the IPN-PSTN gateway 318 may convert control signals from a first format (e.g., SIP signals) into control signals in a second format (e.g., SS7 signals).

The network arrangement 100 of FIG. 1 may be arranged as the network arrangement 300. In this regard, the network 102 may include one or more of the networks 302-208, each of the call servers 110-112 may one of the servers 310-314, and each of the communication devices 104-108 may be one of the communication devices 320-332.

Figure 4:
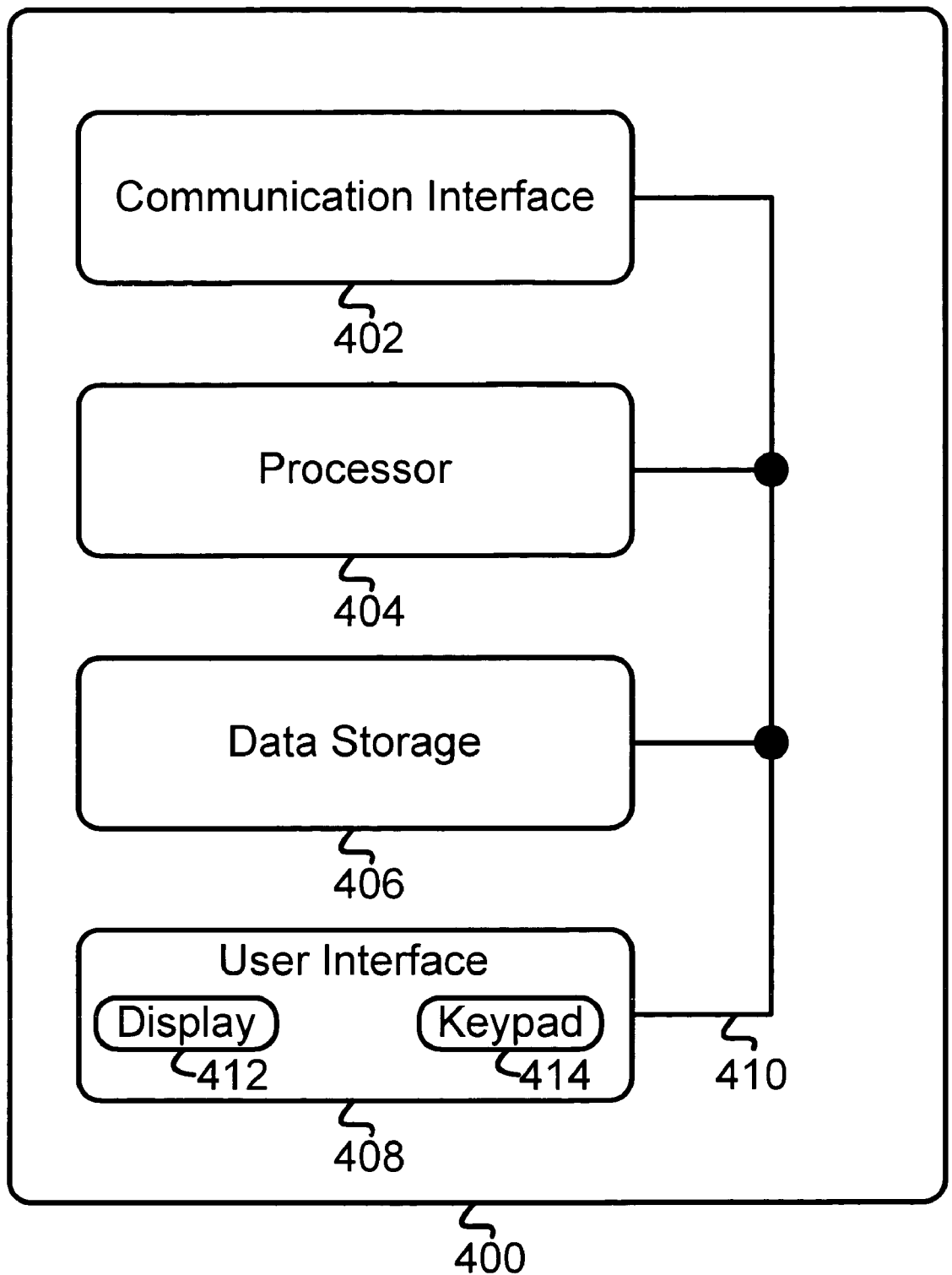
FIG. 4 is a simplified block diagram of an exemplary communication device operable with the exemplary embodiment.

FIG. 4 is a simplified block diagram depicting an exemplary arrangement of a communication device, such as any of the communication devices 104-108 and 320-332. Communication device 400 may include a communication interface 402, a processor 404, data storage 406, and a user interface 408, all linked together via a system bus, network, or other connection mechanism 410. The user interface 408 may include a display 412 and a keypad 414. The communication device 400 may include additional components as well or may vary in other ways from the arrangement shown.

The communication interface 402 provides means for the communication device 400 to communicate via a network, such as the network 102, the IPN 302, the PBX network 304, the RAN 306, or the PSTN 308. The communication interface 402 may communicate via the network by receiving communications from the network and/or by transmitting communications to the network.

In accordance with an example in which the communication device 400 is a wireless communication device (e.g., the wireless communication device 326), the communication interface 402 may include a chipset and antenna for performing wireless communications over the air interface 340. An exemplary chipset that facilitates communication according to a CDMA air interface protocol is the MSM6000™ chipset manufactured by Qualcomm Incorporated of San Diego, Calif. Other examples of a chipset for performing wireless communications over the air interface 340 and other examples of air interface protocols are also possible.

In accordance with an example in which the communication device 400 is a wired communication device (e.g., communication device 320), the communication interface 402 may include a chipset for performing wireline communications. A chipset for performing wireline communications may be mounted on a network interface card (NIC). An exemplary NIC with a chipset for performing wireline communications according to the Institute of Electrical and Electronics Engineers (IEEE) 802.3® standard for Carrier Sense Multiple Access with Collision Detection (CSMA/CD) Access Method is the SP2610R Gigabit Ethernet Adapter NIC manufactured by the Spectrum Technologies Corporation of Taipei Hsien, Taiwan, Republic of China. Other examples of NICs with a chipset for performing wireline communications and other examples of wireline communication standards are also possible.

The processor 404 may comprise one or more general purpose processors (e.g., INTEL microprocessors) and/or one or more special purpose processors (e.g., digital signal processors). The processor 404 may execute computer-readable program instructions that cause the processor 404 to communicate with the communication interface 402, the data storage 406, the user interface 408, the display 412, and the keypad 414 by the transmission of analog and/or digital signals via the connection mechanism 410. In this way, the processor 404 can cause the communication interface 402, the data storage 406, the user interface 408, the display 412, and the keypad 414 to carry out various functions described herein.

As an example, the communication interface 402 may receive the missed call notification 206, and thereafter provide the missed call notification 206 to the processor 404. After receiving the missed call notification 206, the processor 404 may execute program instructions that cause the user interface 408 to visually present the missed call notification 206 at the display 412.

The data storage 406 comprises a computer-readable storage medium readable by the processor 404. The computer-readable storage medium may comprise volatile and/or non-volatile storage components, such as optical, magnetic, organic or other memory or disc storage, which can be integrated in whole or in part with the processor 404. Alternatively, the entire computer-readable storage medium may be remote from the processor 404 and the processor 404 may communicate with the remote computer-readable storage medium via the connection mechanism 410.

The data storage 406 may include a missed call log. The missed call log may contain one or more missed call notification entries. The missed call notification entries may be for missed calls that were placed directly to the communication device 400 and/or for missed calls that were placed to another communication device (e.g., the third communication device 108).

The data storage 406 may store the computer-readable program instructions executable by the processor 404. For example, the data storage 406 may store program instructions executable by the processor 404 to cause the processor 404 to initiate the second call 208 to the second communication device 106 and to direct the network 102 to deliver to the second communication device 106 caller ID information indicating that the second call 208 originates from the third communication device 108. The processor 404 may initiate the second call 208 by executing program instructions that cause the communication interface 402 to send the call origination 210 to the network 102 for transmission, in turn, to the call server 112.

The processor 404 may direct the network 102 to deliver the caller ID information to the second communication device 106 in various ways. For example, the processor 404 may direct the network 102 to deliver the caller ID information by executing program instructions that cause the communication interface 402 to send the call origination 210 including the caller ID information to the network 102. In this regard, the call origination 210 may be a SIP INVITE message comprising the caller ID information or DTMF tones representing a feature code and the caller ID information. Other examples of the how the processor 404 directs the network to deliver the caller ID information to the second communication device are also possible.

The keypad 414 may include a set of keys such as a set of keys typically found on a phone. For example, the set of keys may include twelve keys and each of the twelve keys may be associated with one of the following characters: 1, 2, 3, 4, 5, 6, 7, 8, 9, *, 0, and #. These keys may allow a user to enter the phone number associated with the second communication device 106, a feature code (e.g., '*93'), and the phone number associated with the third communication device 108. Alternatively, or in combination, the set of keys may include other keys such as a key to scroll through a list of missed calls and/or a key to select a missed call to be returned. Other examples of keys of the set of keys are also possible.

The display screen 412 may be a liquid crystal display (LCD) or another type of display. The display screen 412 and the keypad 414 may be integrated together as touch screen, such as a pressure-sensitive (resistive) touch screen, an electrically-sensitive (capacitive) touch screen, or a photo-sensitive (infrared) touch screen. Other examples of touch screens are also possible.

The display screen 412 may visually present a missed call notification such as the missed call notification 206. The display 412 may be dedicated to displaying only missed call notifications or may display missed call notifications and other information such as a current time of day, a number dialed via the keypad 414, and caller ID information for an incoming call. Presenting the missed call notification 206 may include presenting information contained within the missed call notification 206.

The user interface 408 may receive a user input that corresponds to a missed call notification. Receiving the user input may consist of a user selecting a missed call to be returned. For example, the user interface 408 may receive a user input corresponding to the missed call notification 206. This user input may indicate the user has selected to return the first missed call 200. The user interface 408 may provide the user input to the processor 404. In response to receiving the user input, the processor 404 may responsively execute program instructions that cause the processor 404 to initiate the second call 208 and to direct the network 102 to deliver to the second communication device 106 caller ID information indicating the second call 208 originates from the third communication device 108.

The user interface 408 may receive other user inputs as well. For instance, the user interface 408 may receive a user input that causes the display 412 to scroll through missed call notifications being displayed on the display 412 or to cause other missed call notifications to be displayed. As another example, the user interface 408 may receive a user input that causes a missed call notification entry to be deleted from the missed call log stored in the data storage 406. As yet another example, the user interface 408 may receive a user input representing caller ID information that may be used to masquerade the identity of the first communication device 104. In this regard, the caller ID information may be for a communication device other than the first communication device 104 or the third communication device 108. Other examples of user inputs that may be received at the user interface 408 are also possible.

Figure 5:
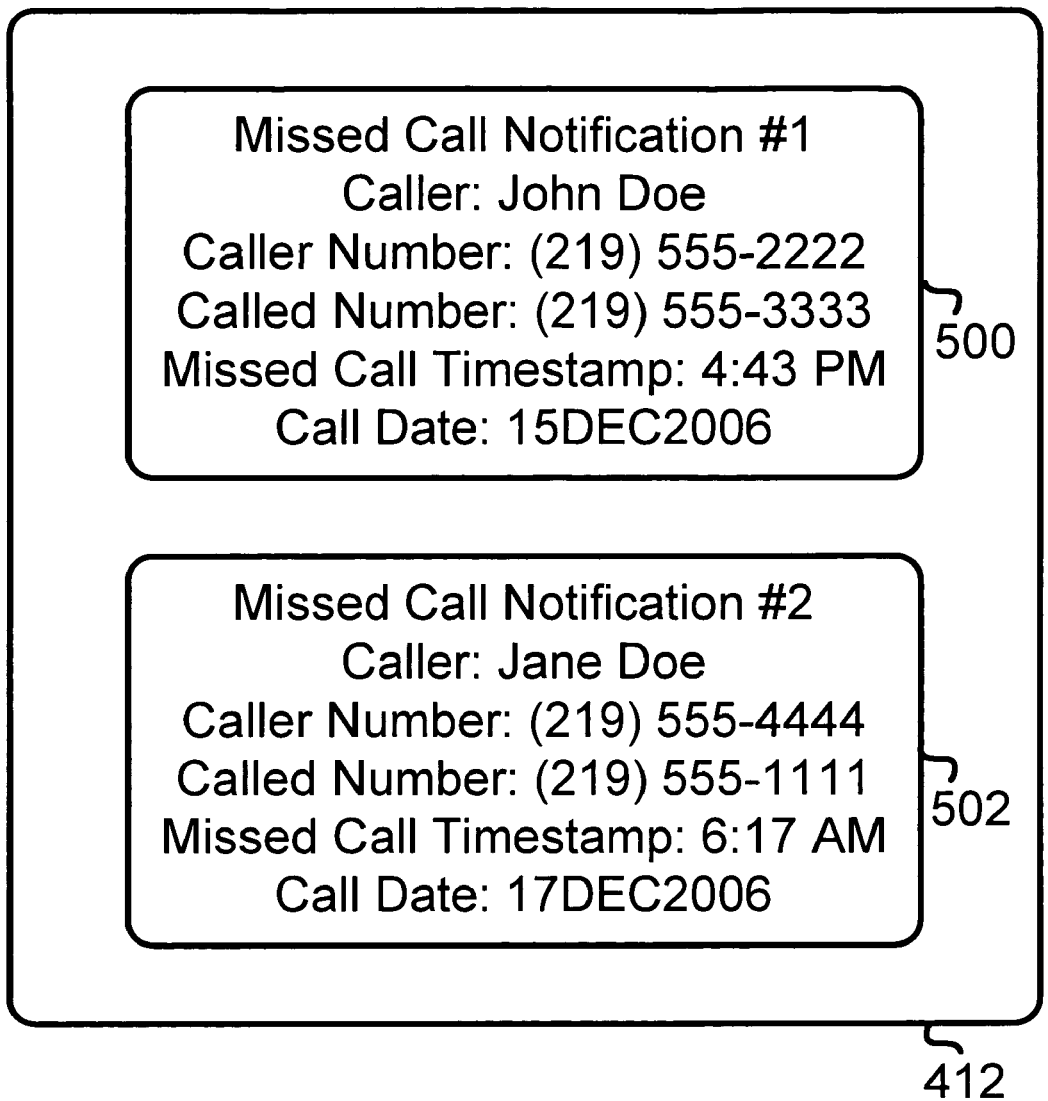
FIG. 5 depicts an exemplary display presenting missed call notifications.

FIG. 5 illustrates a first missed call notification 500 and a second missed call notification 502 being presented at the display 412. Alternatively, the display 412 may present a number of missed call notifications greater than or less than two missed call notifications. The first missed call notification 500 and the second missed call notification 502 may each contain (i) a caller name, (ii) a caller number, (iii) a called number, (iv) a missed call timestamp, and (v) a call date. Missed call notifications may be for missed calls placed to the same communication device, or as shown in FIG. 5, for missed calls placed to different communications devices (e.g., the notification 500 is for a missed call placed to the first communication device 104 and the notification 502 is for a missed call placed to third communication device 108).

In the first missed call notification 500, the caller name is 'John Doe,' the caller number is '(219) 555-2222,' the called number is '(219) 555-3333,' the missed call timestamp is '4:43 PM' and the call date is 'Dec. 15, 2006.' The first missed call notification 500 indicates that the second communication device 106 placed the missed call to the third communication device 108. The missed call notification 206 may be the missed call notification 500.

In the second missed call notification 502, the caller name is 'Jane Doe,' the caller number is '(219) 555-4444,' the called number is '(219) 555-1111,' the missed call timestamp is '6:17 AM,' and the call date is 'Dec. 17, 2006.' The second missed call notification 502 may indicate that a communication device associated with the phone number (219) 555-4444 placed a call to the first communication device 104.

A missed call notification is not limited to the information contained in the missed call notifications 500-502. For instance, a missed call notification may include more or less information than the information shown in either of the missed call notifications 500-502. Further, the information of the missed call notifications 500-502 may be presented in a different order than shown. Also, the information of the missed call notifications 500-502 may consist of information in a different format. For example, a caller number and/or a called number may be a URI associated with a communication device. Other variations of the information contained in a missed call notification are also possible.

3. Exemplary Operation

Figure 6:
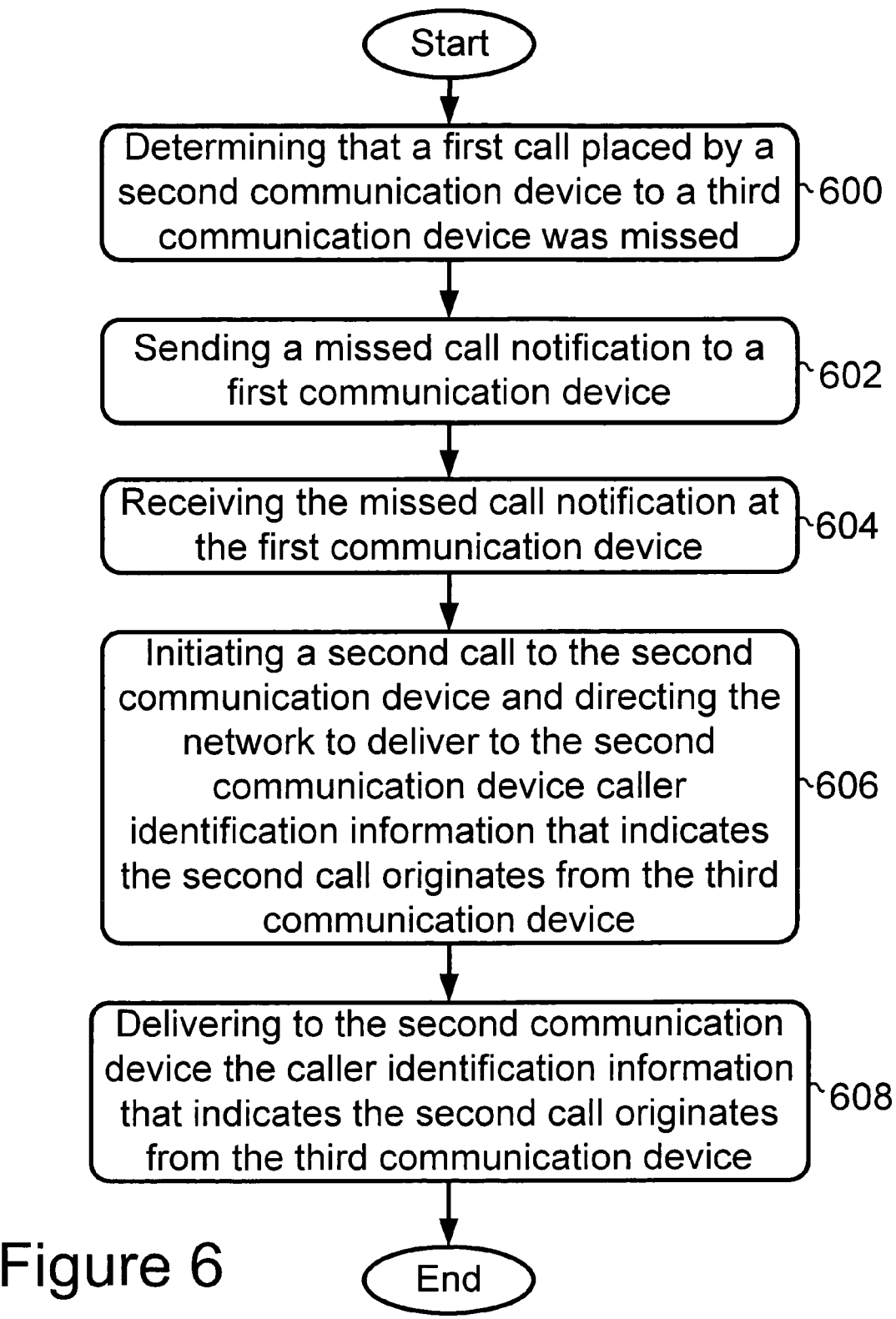
FIG. 6 is a flow chart depicting a set of functions that can be carried out in accordance with exemplary embodiments of the present invention.

FIG. 6 is a flow chart provided to illustrate some functions that may be carried out in accordance with exemplary embodiments of the present invention. The functions of FIG. 6 are described as being performed by elements described in FIGS. 1-5.

As shown in FIG. 6, block 600 includes determining that a first call (e.g., call 200) placed by the second communication device 106 to the third communication device 108 is missed. A network entity, (e.g., the server 310, the MSC 334, or the SSP 344) may use any of a variety of methods to determine that the first call 200 is missed. For example, the network entity may determine the first call 200 is missed by detecting that the first call 200 is not answered at the third communication device 108 within a given period of time after the second communication device 106 initiates the first call 200.

As another example, the network entity may determine the first call 200 is missed by detecting that the first call 200 is not answered after a given number of ring tones have been presented to the third communication device 108 by the network 102. As yet another example, the network entity may determine the first call 200 is missed by receiving from the third communication device 108 a SIP CANCEL message indicating the third communication device 108 is cancelling set up of a media session. Other examples of how the network entity may determine the first call 200 is missed are also possible.

After determining that the first call 200 was missed, the network entity may access a profile (e.g., retrieve the profile) stored in a data storage medium readable by the network entity. The profile may associate the third communication device 108 with the first communication device 104. In this way, after the network entity determines the first call 200 is missed by the third communication device 108, the network entity may access the profile to determine that the missed call notification 206 is to be sent to the first communication device 104.

Next, block 602 includes sending a missed call notification (e.g., the missed call notification 206) to the first communication device 104. The missed call notification 206 may indicate that the first call 200 was placed by the second communication device 106 to the third communication device 108 and that the first call 200 was missed. The network entity that determines the first call 200 was missed and that determines the missed call notification is to be sent to the first communication device 104 may initiate transmission of the missed call notification 206. For instance, the server 310 may initiate the transmission of the missed call notification 206 by transmitting a SIP message containing the missed call notification 206.

After the missed call notification 206 is placed onto the network 102 for transmission to the first communication device 104, the network 102 may convert the missed call notification 206 from a first form (e.g., a SIP message) to a second form (e.g., an SMS text message) and thereafter deliver the missed call notification (in its second form) to the first communication device 104. Alternatively, the missed call notification 206 may be transmitted to the first communication device 104 without being converted to a second form, or the missed call notification 206 may be converted to one or more other forms as well before being received at the first communication device 104.

Next, block 604 includes receiving the missed call notification 206 at the first communication device 104. Receiving the first missed call notification 206 may include receiving a message that describes the first call 200. This message could be a SIP message, an SMS message, an MMS message, an e-mail message, a PBX missed call message, or another type of message describing the first call 200. As an example, the first call 200 may be described in a message containing information such as a caller's name, a caller's number, and a called number. Other examples of a message describing the first call 200 are also possible.

The communication interface 402 may receive the first missed call notification 206 from the network 102 and thereafter provide the missed call notification 206 to the processor 404. After receiving the first missed call notification 206, the processor 404 may send to the missed call log in the data storage 406 an entry that indicates the first call 200 was missed. The processor 404 may cause the entry to be added to the missed call log. Thereafter, the processor 404 may retrieve the entry from the missed call log and then cause the user interface 408 to present the entry that indicates the first call 200 was missed (e.g., the missed call notification 500 may be presented on the display 412).

The processor 404 may cause the user interface 408 to present the first missed call notification 206 on the display 412. The user interface 408 may receive a user input corresponding to the first missed call notification 206 while the notification is being presented on the display 412. The user interface 408 may receive the user input by detecting the pressing of one or more keys on the keypad 414. For example, the user interface 408 may detect the pressing of keys in the following sequence: 2195552222*932195553333. In this regard, the first ten key presses '2195552222' may indicate the telephone number of the communication device to be called (i.e., the second communication device 106), the next three key presses '*93' may indicate a feature code for masquerading the identity of the first communication device 104, and the last ten key presses '2195553333' may indicate the caller ID information to be delivered to the second communication device 106.

As another example, the user interface 408 may detect a user input selecting a given missed call to be returned from a list of missed calls. For example, the given missed call may be the call described by the first missed call notification 500. In response to detecting this user input, the user interface 408 may produce a user input signal representing the received user input and provide the user input signal to the processor 404. In response to receiving this user input signal, the processor 404 may execute one or more program instructions that cause the communication device 400 to return (or at least initiate return of) the given missed call. In this way, a user may return (or at least initiate return of) the given missed call without having to enter a number to be called, a feature code, and/or caller ID information to be delivered to the second communication device 106.

Next, block 606 includes initiating a second call 208 to the second communication device 106 and directing the network 102 to deliver to the second communication device 106 caller ID information that indicates the second call 208 originates from the third communication device 108. The first communication device 104 may initiate the second call 208 and direct the network to deliver the caller ID information. The first communication device 104 may use various methods to initiate the second call 208 and to direct the network 102 to deliver the caller ID information that indicates the second call 208 originates from the third communication device 108. For example, the first communication device 104 may send to the network 102 a call origination message (e.g., the call origination 210) including a request to initiate the second call 208 and a request for the network 102 to deliver the caller ID information to the second communication device 106.

As another example, the first communication device 104 may send a call origination message (e.g., the call origination 210) including a request to initiate the second call 208, and a separate request not included within the call origination request 210 so as to direct the network 102 to deliver the caller ID information to the second communication device. Preferably, the separate request is sent to the network 102 substantially at the same time the call origination message is sent to initiate the second call 208.

Initiation of the second call 208 may include various aspects of initiating a call. For example, initiation of the second call 208 may include the first communication device 104 merely sending to the network 102 the call origination message 210. As another example, initiation of second call 208 may include the first communication device 104 sending to the network 102 the call origination message 210 and the network 102 connecting the first communication device 104 and the second communication device 106 such that users of the communication devices 104-106 may commence communications. Other examples of the various aspects of initiating the second call 208 are also possible.

The processor 404 may execute program instructions so as to cause the communication interface 402 to send the call origination 210 to the network 102. The processor 404 may execute these program instructions in response to the processor 404 directing the display 412 to display the missed call notification 206 and after receiving from the user interface 414 a user input indicating a user has requested the second call 208 be placed.

Next, block 608 includes delivering to the second communication device 106 the caller identification information that indicates the second call 208 originates from the third communication device 108. Various methods may be used to deliver the caller ID information to the second communication device 106. For example, the caller ID information may be delivered to the second communication device 106 by way of a call origination message (e.g., a SIP INVITE message) that includes the caller identification information.

As another example, the caller ID information may be delivered to the second communication device 106 by way of a distinct caller ID message that is sent to the second communication device 106 between ring tones sent to the second communication device 106 to inform a user of the second communication device 106 that the second call 208 is available to be answered. In this example, the second communication device 106 may be a legacy POTS phone and/or a legacy PBX network phone. Other examples of methods for delivering the caller ID information to the second communication device 106 are also possible.

After the caller ID information is delivered to the second communication device 106, the second communication device 106 may display the caller ID information on a display of the second communication device 106 or at a display of a caller ID device that connects to the second communication device 106. In this way, a user of the second communication device 106 may be presented with caller ID information that indicates the second call 208 originates from the third communication device 108.

4. Conclusion

Exemplary embodiments of the present invention have been described above. Those skilled in the art will understand, however, that changes and modifications may be made to the embodiments described without departing from the true scope and spirit of the present invention, which is defined by the claims.

We claim:

1. A method comprising:
   a first communication device receiving a missed call notification that indicates a first call was placed by a second communication device to a third communication device; and
   thereafter, the first communication device initiating a second call to the second communication device and directing a network to deliver to the second communication device caller identification information that indicates the second call originates from the third communication device.

2. The method of claim 1, wherein initiating the second call to the second communication device and directing the network to deliver caller identification information to the second communication device includes the first communication device sending to the network a call origination request to initiate the second call and to direct the network to deliver caller identification information to the second communication device.

3. The method of claim 2,
   wherein the call origination request is a Session Initiation Protocol (SIP) INVITE message containing the caller identification information, and
   wherein the caller identification information contains an identifier associated with the third communication device.

4. The method of claim 2,
   wherein the call origination request comprises a feature code, the caller identification information, and an identifier associated with the second communication device, and
   wherein the caller identification information contains an identifier associated with the third communication device.

5. The method of claim 4, wherein the identifier associated with the third communication device is a telephone number associated with the third communication device, and
   wherein the identifier associated with the second communication device is a telephone number associated with the second communication device.

6. The method of claim 1,
   wherein the first communication device includes a missed call log,
   the method further comprising:
   in response to receiving the missed call notification, adding into the missed call log of the first communication device an entry that indicates the first call was missed.

7. The method of claim 1,
   wherein the first communication device includes a user interface,
   the method further comprising:
   after receiving the missed call notification, visually presenting the missed call notification via the user interface.

8. The method of claim 7, further comprising:
   receiving at the user interface a user input corresponding to the visually presented missed call notification,
   wherein initiating the second call to the second communication device, and directing the network to deliver to the second communication device the caller identification information that indicates that the second call originates from the third communication device, occur in response to receiving the user input.

9. The method of claim 1, wherein receiving the missed call notification includes receiving a message describing the first call, wherein the message is selected from the group consisting of: (i) a Session Initiation Protocol (SIP) message, (ii) a Short Message System (SMS) message, (iii) a Multimedia Message Service (MMS) message, (iv) an e-mail message, and (v) a private branch exchange (PBX) missed call message.

10. The method of claim 1,
wherein the network includes a server having access to a profile, the profile associating the first communication device with the third communication device,
the method further comprising:
at the server, determining that the first call was missed and responsively accessing the profile to determine that the missed call notification is to be sent to the first communication device, and
thereafter, sending the missed call notification from the server to the first communication device.

11. A first communication device comprising:
a communication interface for communicating with a network;
a processor connected to the communication interface; and
data storage connected to the processor, the data storage containing program instructions executable by the processor,
wherein the processor receives from the communication interface via the network a missed call notification that indicates a first call was placed by a second communication device to a third communication device, and
wherein the program instructions comprise instructions that cause the processor to initiate a second call to the second communication device and to direct the network to deliver to the second communication device caller identification information that indicates the second call originates from the third communication device.

12. The first communication device of claim 11, further comprising:
a user interface to visually present the missed call notification, to receive user input corresponding to the visually presented missed call notification, and to provide the user input to the processor,
wherein the processor executes the program instructions in response to receiving the user input.

13. The first communication device of claim 12, wherein the processor directs the network to deliver the caller identification information to the second communication device by sending to the network a feature code and an identifier associated with the third communication device.

14. The first communication device of claim 13,
wherein the feature code includes a star character and a feature number, and
wherein the identifier of the third communication device is a telephone number associated with the third communication device.

15. The first communication device of claim 12, wherein the user interface further presents a visual indication of one or more missed calls placed directly to the first communication device.

16. The first communication device of claim 11,
wherein the first communication device is a wireless communication device, and
wherein the network is a wireless network.

17. The first communication device of claim 11, wherein the received missed call notification comprises a message describing the first call, wherein the message is selected from the group consisting of: (i) a Session Initiation Protocol (SIP) message, (ii) a Short Message System (SMS) message, (iii) a Multimedia Message Service (MMS) message, (iv) an e-mail message, and (v) a private branch exchange (PBX) missed call message.

18. The first communication device of claim 11,
wherein the communication interface sends to the network and receives from the network Session Initiation Protocol (SIP) messages, and
wherein the processor initiates the second call and directs the network to deliver the caller identification information by causing the communication interface to send to the network a SIP INVITE message containing the caller identification information.

19. A method carried out by a server operating within system comprising the server, a first communication device, a second communication device, and a third communication device, the method comprising:
transmitting, from the server to the first communication device, a missed call notification indicating a first call was placed by the second communication device to the third communication device;
receiving from the first communication device a first call origination request to: (i) initiate a second call to the second communication device, and (ii) deliver to the second communication device caller identification information indicating the second call originates from the third communication device; and
in response to receiving the first call origination request, sending to the second communication device a second call origination request and the caller identification information indicating the second call originates from the third communication device.

20. The method of claim 19,
wherein the second call origination request includes the caller identification information indicating the second call originates from the third communication device.

21. The method of claim 19, further comprising:
prior to transmitting the missed call notification:
(i) storing, in a computer-readable data storage device accessible by the server, a profile associated with the third communication device, wherein the profile indicates, when the third communication device misses a call, a missed call notification should be sent to the first communication device;
(ii) the server determining that the third communication device missed the first call; and
(iii) the server accessing the profile and determining that the missed call notification should be sent to the first communication device.

22. The method of claim 19, further comprising:
the server determining that the first call was missed by the third communication device, wherein the server determines that the first call was missed by the third communication device by performing a function selected from the group consisting of (i) the server receiving a message indicating that the first call should be canceled, (ii) the server receiving a message indicating that the set up of the first call should be cancelled, (iii) the server receiving a session initiation protocol (SIP) CANCEL message indicating that the first call should be canceled, (iv) the server receiving a SIP CANCEL message indicating that the set up of the first call should be cancelled, (v) the server determining that the third communication device did not answer the first call within a given period of time and the server executing program instructions to end the first call, and (vi) the server determining that the third communication device did not answer the first call within a given period of time and the server executing program instructions to end set up of the first call.

23. The method of claim 1, further comprising:
delivering, to the second communication device, the caller identification information that indicates the second call originates from the third communication device; and
the second communication device displaying, on a display of the second communication device, the caller identification information that indicates the second call originates from the third communication device.

\* \* \* \* \*